US012696346B2

(12) United States Patent　　　　　(10) Patent No.:　US 12,696,346 B2
Zhang et al.　　　　　　　　　　　　　(45) Date of Patent:　　　Jul. 28, 2026

(54) METHOD, APPARATUS AND COMPUTER PROGRAM PRODUCT FOR CONTROLLING DEVICE-TO-DEVICE COMMUNICATION

(71) Applicant: Telefonaktiebolaget LM Ericsson (PUBL), Stockholm (SE)

(72) Inventors: Zhang Zhang, Beijing (CN); Muhammad Ali Kazmi, Sundbyberg (SE); Min Wang, Luleå (SE); Santhan Thangarasa, Vällingby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 308 days.

(21) Appl. No.: 18/551,555

(22) PCT Filed: Mar. 28, 2022

(86) PCT No.: PCT/IB2022/052851
§ 371 (c)(1),
(2) Date: Sep. 20, 2023

(87) PCT Pub. No.: WO2022/201134
PCT Pub. Date: Sep. 29, 2022

(65) Prior Publication Data
US 2024/0172324 A1　　May 23, 2024

(30) Foreign Application Priority Data
Mar. 26, 2021　(WO) ................ PCT/CN2021/083322

(51) Int. Cl.
*H04W 76/28*　　(2018.01)
*H04W 92/18*　　(2009.01)

(52) U.S. Cl.
CPC ............ *H04W 76/28* (2018.02); *H04W 92/18* (2013.01)

(58) Field of Classification Search
CPC ... H04W 4/46; H04W 52/0216; H04W 76/14; H04W 76/23; H04W 76/28; H04W 92/18
See application file for complete search history.

(56) References Cited

U.S. PATENT DOCUMENTS

2021/0059005 A1　　2/2021　Hosseini et al.
2022/0295594 A1*　9/2022　Spapis .................. H04W 76/28
(Continued)

OTHER PUBLICATIONS

EPO Communication under Rule 71(3) EPC issued for Application No. 22 714 591.9-1215—Nov. 8, 2024.
(Continued)

*Primary Examiner* — Awet Haile
(74) *Attorney, Agent, or Firm* — Baker Botts L.L.P.

(57) ABSTRACT

A method (400) by a first wireless communication device (101) for controlling D2D communication between a first wireless communication device and a second wireless communication device (103) includes transmitting (402), to the second wireless communication device, a DRX configuration for the D2D communication with the second wireless communication device. The first wireless communication device applies (404) the DRX configuration for the D2D communication with the second wireless communication device and receives (406), from the second wireless communication device, a notification indicating that the DRX configuration is unsuitable. Based on the notification, the first wireless communication device reconfigures (408) the DRX configuration and/or notifying a network node that the applied DRX configuration is unsuitable.

26 Claims, 6 Drawing Sheets

(56) References Cited

U.S. PATENT DOCUMENTS

| | | | | |
|---|---|---|---|---|
| 2022/0304103 A1* | 9/2022 | Cheng | ................... | H04W 76/14 |
| 2023/0239957 A1* | 7/2023 | Fujishiro | ........... | H04W 52/0229 |
| 2023/0269755 A1* | 8/2023 | Kang | ............... | H04W 52/0229 |
| | | | | 370/329 |
| 2023/0309016 A1* | 9/2023 | Li | ........................ | H04W 76/14 |

OTHER PUBLICATIONS

3GPP TSG RAN Meeting #89e; Electronic Meeting, Sep. 14-18, 2020; Source: LG Electronics; Title: WID revision: NR sidelink enhancement; Document for: Approval; Agenda Item: 9.8.3 (RP-201516 (revision of RP-201385)).

PCT Notification of Transmittal of the International Search Report and the Written Opinion of the International Searching Authority, or the Declaration issued for International application No. PCT/IB2022/052851—Jul. 5, 2022.

3GPP TS 38.331 V16.2.0 (Sep. 2020); 3rd Generation Partnership Project; Technical Specification Group Radio Access Network; NR; Radio Resource Control (RRC) protocol specification (Release 16).

3GPP TS 38.321 V16.2.1 (Sep. 2020); 3rd Generation Partnership Project; Technical Specification Group Radio Access Network; NR; Medium Access Control (MAC) protocol specification (Release 16).

3GPP TS 38.212 V16.4.0 (Dec. 2020); 3rd Generation Partnership Project; Technical Specification Group Radio Access Network; NR; Multiplexing and channel coding (Release 16).

* cited by examiner

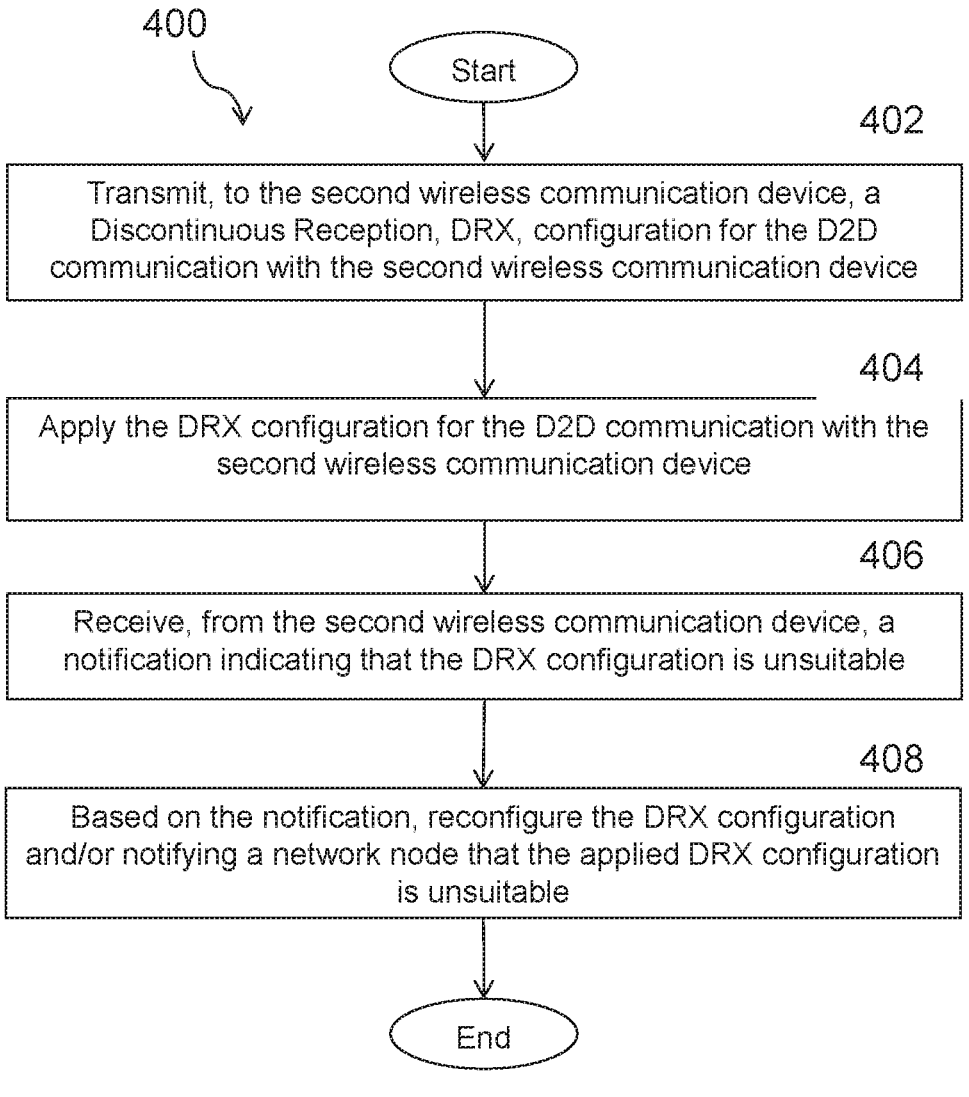

400

Start

402

Transmit, to the second wireless communication device, a Discontinuous Reception, DRX, configuration for the D2D communication with the second wireless communication device

404

Apply the DRX configuration for the D2D communication with the second wireless communication device

406

Receive, from the second wireless communication device, a notification indicating that the DRX configuration is unsuitable

408

Based on the notification, reconfigure the DRX configuration and/or notifying a network node that the applied DRX configuration is unsuitable End

FIGURE 4

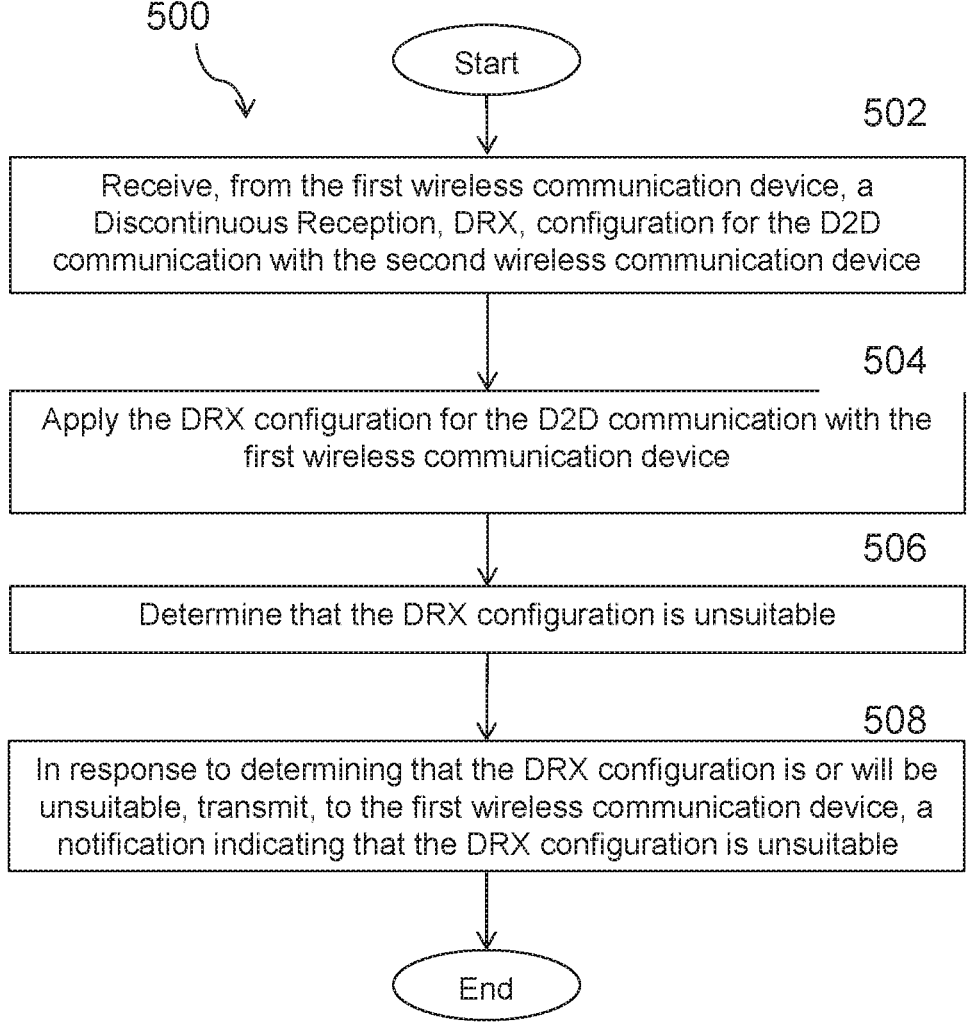

500

Start

502

Receive, from the first wireless communication device, a Discontinuous Reception, DRX, configuration for the D2D communication with the second wireless communication device

504

Apply the DRX configuration for the D2D communication with the first wireless communication device

506

Determine that the DRX configuration is unsuitable

508

In response to determining that the DRX configuration is or will be unsuitable, transmit, to the first wireless communication device, a notification indicating that the DRX configuration is unsuitable End

FIGURE 5

METHOD, APPARATUS AND COMPUTER PROGRAM PRODUCT FOR CONTROLLING DEVICE-TO-DEVICE COMMUNICATION

PRIORITY

This nonprovisional application is a U.S. National Stage Filing under 35 U.S.C. § 371 of International Patent Application Serial No. PCT/IB2022/052851 filed Mar. 28, 2022 and entitled "Method, Apparatus and Computer Program Product For Controlling Device-to-Device Communication" which claims priority to International Patent Application Serial No. PCT/CN2021/083322 filed Mar. 26, 2021, both of which are hereby incorporated by reference in their entirety.

TECHNICAL FIELD

The present invention generally relates to wireless or mobile communication. More particularly, the present invention relates to a method for controlling Device-to-Device (D2D) communication in a wireless communication network. The present invention also relates to apparatus and computer program product adapted for the same purpose.

BACKGROUND

For 5$^{th}$ Generation (5G) New Radio (NR), the Discontinuous Reception (DRX) procedures are described in 3GPP TS 38.321. When configured, the DRX functionality controls the expected User Equipment (UE) behavior in terms of reception and processing of transmissions. Broadly speaking, the DRX functionality defines the notion of Active Time (also referred to as Active Time state or ACTIVE state), in which the UE is expected to receive and process incoming transmissions as appropriate. For example, the UE is expected to decode the downlink (DL) control channels, and process grants, etc. during Active Time.

When a UE is not in Active Time, there is no expectation that the UE receives and processes transmissions. That is, a Base Station (BS) cannot assume that the UE will be listening to DL transmissions. The DRX configuration defines the transition between states.

Typically, UEs that are not in Active Time turn off some of their components and enter a low-power (i.e., sleeping) mode. To ensure that a UE switches regularly to Active Time (i.e., wakes up), a DRX cycle is defined. This DRX cycle is controlled by two parameters:

The periodicity of the DRX cycle, which controls how frequently the UE switches to Active Time.

The duration of the Active Time, which controls how long the UE is in active state.

In addition to this basic cycle, the DRX procedures also define other conditions that may allow the UE to switch between Active Time and Inactive Time. For example, if a UE is expected to receive a retransmission from a gNodeB (gNB), the UE may enter Inactive Time (i.e., while the gNB prepares the retransmission) and then may enter Active Time (i.e., during a window in which the gNB may send the transmission).

The Active Time due to the DRX cycle is determined by the DRX configuration. In other words, it is easy to predict when the UE will be in Active Time for the DRX cycle (unless the UE is explicitly commanded to leave Active Time). However, UE may be transitioned to or from Active Time based on other timers, and it is not easy to predict whether a UE is in Active Time due to other timers because the start and stop of these timers depends on the traffic of packets.

Some of the timers in the DRX procedure are defined for each HARQ process. To determine whether it is in Active Time or not, the UE will consider the timers for all the relevant HARQ processes. The detailed description on the DRX procedures could be found in Table 1 in Section 5.7 in 3GPP TS 38.321 (v16.2.1), which is incorporated herein by reference in its entirety.

Third Generation Partnership Project (3GPP) specifies the Long Term Evolution (LTE) device-to-device (D2D) technology, which is also known as sidelink (SL) or the PC5 interface, as part of Release 12 (Rel-12). The target use cases (UCs) include the Proximity Services (communication and discovery). Support is enhanced in Rel-13. In Rel-14, the LTE sidelink was extensively redesigned to support vehicular communications (commonly referred to as Vehicle-to-Anything (V2X) or Vehicle-to-Vehicle (V2V). Support is again enhanced during Rel-15. From the point of view of the lowest radio layers, the LTE SL uses broadcast communication. That is, transmission from a UE targets any receiver that is in range.

Proximity Services (ProSe) is described in the Release 12 and 13 of LTE. Later in Rel. 14 and 15, LTE V2X related enhancements targeting the specific characteristics of vehicular communications are described. In LTE, V2X-only broadcast is supported over sidelink.

In Rel-16, 3GPP introduces the sidelink for the 5G NR. The driving UC were vehicular communications with more stringent requirements than those typically served using the LTE SL. To meet these requirements, the NR SL is capable of broadcast, groupcast, and unicast communications. In groupcast communication, the intended receivers of a message are typically a subset of the vehicles near the transmitter, whereas in unicast communication, there is a single intended receiver.

Both the LTE SL and the NR SL can operate with and without network (NW) coverage and with varying degrees of interaction between UEs and NW, including support for standalone, NW-less operation.

In the upcoming Rel-17, 3GPP will work on enhancements for the NR SL. The ambition is not only to improve the capabilities of NR SL for V2X but also to address other UCs such as National Security and Public Safety (NSPS) as well as commercial UCs such as Network Controlled Interactive Services (NCIS). In the future, the NR SL may be enhanced further to address other UCs too.

In V2X, UEs are typically mounted in a car and have no important power restrictions. In contrast, NSPS or NCIS mostly use handheld UEs, for which energy efficiency is a concern. With this in mind, the Rel. 17 Work Item on NR SL enhancements (RP-193231) includes the study and specification of SL DRX mechanism as one of its objectives. This includes defining SL DRX configurations and the corresponding UE procedure, specifying mechanisms to align SL DRX configurations among the UEs communicating with each other, and specifying mechanisms to align SL DRX configurations with Uu DRX configurations for an in-coverage UE. In a recent RAN2 meeting, it was agreed that Uu alike DRX configuration is applied to SL for all cast types. More specifically, drx-onDurationTimer will be introduced for all SL cast types, and drx-InactivityTimer will be introduced for SL unicast. Short DRX cycle is not introduced for SL unicast, groupcast and broadcast in Rel-17.

In RAN2 #113e it agreed that for SL unicast (after SL unicast link is established), SL DRX configuration can be configured per a pair of source/destination, and for out of coverage scenario, the UE (e.g. UE1) who sends out the DRX configuration decides on the DRX configuration. Whether pre-configuration and/or the assistance information from the peer UE (e.g. UE2) is also taken into account by the UE (e.g. UE1) when determining the DRX configuration is still under discussion.

However, it remains uncertain on some issues, e.g., for a SL communication being already configured, when reconfiguration should be triggered or performed. Currently it is lack of criteria to determine whether a SL configuration being used is still suitable/valid. Besides, a UE receiving SL DRX configuration probably finds the configuration is no more suitable or will soon become unsuitable; on the other hand, this is unknown to a peer UE responsible for deciding and sending the SL DRX configuration. Thus SL DRX reconfiguration cannot be performed properly.

SUMMARY

To address the foregoing problems with existing solutions, disclosed is systems and methods for triggering SL DRX reconfiguration when the current SL DRX configuration becomes unsuitable or invalid.

According to certain embodiments, a method by a first wireless communication device for controlling D2D communication between a first wireless communication device and a second wireless communication device includes transmitting, to the second wireless communication device, a DRX configuration for the D2D communication with the second wireless communication device. The first wireless communication device applies the DRX configuration for the D2D communication with the second wireless communication device and receives, from the second wireless communication device, a notification indicating that the DRX configuration is unsuitable. Based on the notification, the first wireless communication device reconfigures the DRX configuration and/or notifying a network node that the applied DRX configuration is unsuitable.

According to certain other embodiments, a method for controlling D2D communication between a first wireless communication device and a second wireless communication device includes receiving, from a first wireless communication device, a DRX configuration for the D2D communication with the first wireless communication device. The second wireless communication device applies the DRX configuration for the D2D communication with the first wireless communication device and determines that the DRX configuration is unsuitable. In response to determining that the DRX configuration is or will be unsuitable, the second wireless communication device transmits, to the first wireless communication device, a notification indicating that the DRX configuration is unsuitable.

According to certain other embodiments, a method by a network node for assisting D2D communication between a first wireless communication device and a second wireless communication device includes receiving, from the first wireless communication device, a notification that a DRX configuration is unsuitable. The network node selects a new DRX configuration for the D2D communication between the first wireless communication device and the second wireless communication device and transmits to at least one of the first wireless communication device and the second wireless communication device, the new DRX configuration for the D2D communication between the first wireless communication device and the second wireless communication device.

According to certain embodiments, a first wireless communication device for controlling D2D communication between the first wireless communication device and a second wireless communication device is adapted to transmit, to the second wireless communication device, a DRX configuration for the D2D communication with the second wireless communication device. The first wireless communication device is adapted to apply the DRX configuration for the D2D communication with the second wireless communication device and receive, from the second wireless communication device, a notification indicating that the DRX configuration is unsuitable. Based on the notification, the first wireless communication device is adapted to reconfigure the DRX configuration and/or notifying a network node that the applied DRX configuration is unsuitable.

According to certain embodiments, a second wireless communication device for controlling D2D communication between a first wireless communication device and the second wireless communication device is adapted to receive, from a first wireless communication device, a DRX configuration for the D2D communication with the first wireless communication device. The second wireless communication device is adapted to apply the DRX configuration for the D2D communication with the first wireless communication device and determine that the DRX configuration is unsuitable. In response to determining that the DRX configuration is or will be unsuitable, the second wireless communication device is adapted to transmit, to the first wireless communication device, a notification indicating that the DRX configuration is unsuitable.

According to certain embodiments, a network node for assisting D2D communication between a first wireless communication device and a second wireless communication device is adapted to receive, from the first wireless communication device, a notification that a DRX configuration is unsuitable and select a new DRX configuration for the D2D communication between the first wireless communication device and the second wireless communication device. The network node is adapted to transmit to at least one of the first wireless communication device and the second wireless communication device, the new DRX configuration for the D2D communication between the first wireless communication device and the second wireless communication device.

Certain embodiments of the present disclosure may provide one or more technical advantages. For example, certain embodiments may enable a UE or network node to determine whether the current SL DRX configuration being used are still suitable/valid, and SL DRX reconfiguration could be triggered when it needs. Thus, the system performance is improved.

As another example, certain embodiments may enable improved DRX coordination between transmitting (TX) and receiving (RX) SL UEs. This is especially important in an in-coverage scenario where the SL and UL resources are shared and, thus, coordination between SL and Uu are necessary.

Other advantages may be readily apparent to one having skill in the art. Certain embodiments may have none, some, or all of the recited advantages.

BRIEF DESCRIPTION OF THE DRAWINGS

The foregoing and other objects, features, and advantages of the invention would be apparent from the following more particular description of preferred embodiments as illustrated in the accompanying drawings in which:

FIG. 4 illustrates an example method by a first wireless device for controlling D2D communication between the first wireless communication device and a second wireless communication device, according to certain embodiments;

FIG. 5 illustrates an example method by a second wireless device for controlling D2D communication between the first wireless communication device and the second wireless communication device, according to certain embodiments.

DETAILED DESCRIPTION

Figure 1:
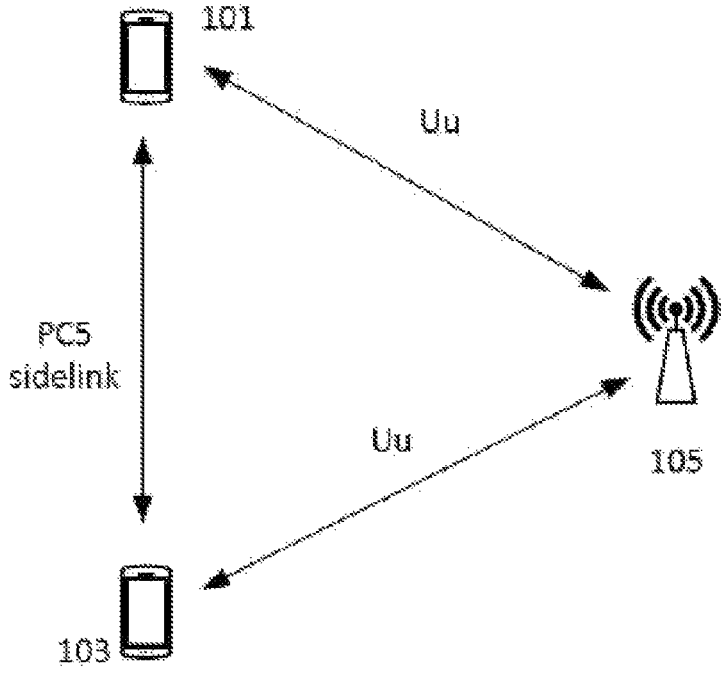
FIG. 1 illustrates an example of a sidelink communication network, according to certain embodiments.

Before describing in detail exemplary embodiments, it is noted that components have been represented where appropriate by conventional symbols in the drawings, showing only those specific details that are pertinent to understanding the embodiments so as not to obscure the disclosure with details that will be readily apparent to those of ordinary skill in the art having the benefit of the description. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments described herein, the term "coupled," "connected," and the like, may be used herein to indicate a connection, although not necessarily directly, and may include wired and/or wireless connections.

The term "network node" used herein can be any kind of network node forming part of a radio network and refer to a base station (BS), radio base station, base transceiver station (BTS), base station controller (BSC), radio network controller (RNC), gNode B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

The term "communication device" herein can be any type of device capable of communicating with a network node or another communication device over radio signals. The communication device might be a wireless communication device (WD) such as a radio communication device, target device, a user equipment (UE), a device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device, etc. The communication device might be a vehicle capable of supporting V2X communications.

The present disclosure herein is mainly described in the context of NR sidelink (SL) communications. However, it is applicable to other kinds of direct communications between UEs involving device-to-device (D2D) communications such as, for example, LTE SL. D2D communication may include but is not limited to anyone of the following: D2D transmission, D2D reception, D2D operation etc. Examples of D2D communication are Vehicle-to-Anything (V2X) communication, proximity services (ProSe), peer to peer communication etc.

For illustrative purpose, some embodiments are described from a point of view of transmitter UE (TX UE) and receiver UE (RX UE). Further, it is assumed that a SL UE and its serving gNB (if the UE is in NW coverage) operates with the same radio access technology (RAT) such as, for example, NR, LTE, and so on. However, all the embodiments are applicable to any combination of RATs between the SL UE and its serving gNB.

The present disclosure discloses mechanisms to trigger SL DRX reconfiguration when the current SL DRX configuration becomes unsuitable or invalid.

According to certain embodiments, a DRX validity Timer is introduced. When the timer expires, the current DRX configuration fallbacks to a default or common DRX configuration or perform SL DRX reconfiguration.

According to a particular embodiment, the duration for the DRX validity Timer can be adjusted. As a result, when the experienced SL communication time deviates too much from the expected SL communication time, it can make the DRX validity Timer expire earlier. On the other hand, when the experienced SL communication time well match the expected SL communication time, it can make the DRX validity Timer expire later.

According to a particular embodiment, for a pair of UEs, when one determines that the current DRX configuration is unsuitable/invalid, the UE may informs its peer UE that the current DRX configuration becomes or will soon become unsuitable and DRX reconfiguration is needed.

According to a particular embodiment, the determination on the current DRX configuration can be made on the basis of a variety of criteria.

According to a particular embodiment, the adjustment or adaption on the duration for the DRX validity timer can be made based on a variety of criteria. The adjustment or adaptation herein comprises resetting the timer, shortening the validity time of the timer and extending the validity time of the timer.

According to a particular embodiment, the UE may further report the suitability/unsuitability of the DRX configuration to a network node, e.g., serving eNB and gNB.

FIG. 1 illustrates an example of a SL communication network. Wireless communication devices (e.g., user equipment (UEs)) 101 and 103 can communicate with a network node 105 (e.g. a base station, eNodeB or gNB). For illustrative purpose, the wireless communication devices 101 and 103 are designated as TX UE and RX UE, respectively. The wireless communication devices 101 and 103 communicate with the network node 105 over the Uu physical interface. The devices 101 and 103 can also communicate directly with each other over a physical interface referred to as a SL. In other words, devices 101 and 103 can communicate directly with each other over the SL, i.e. not via the network node 105.

Figure 2:
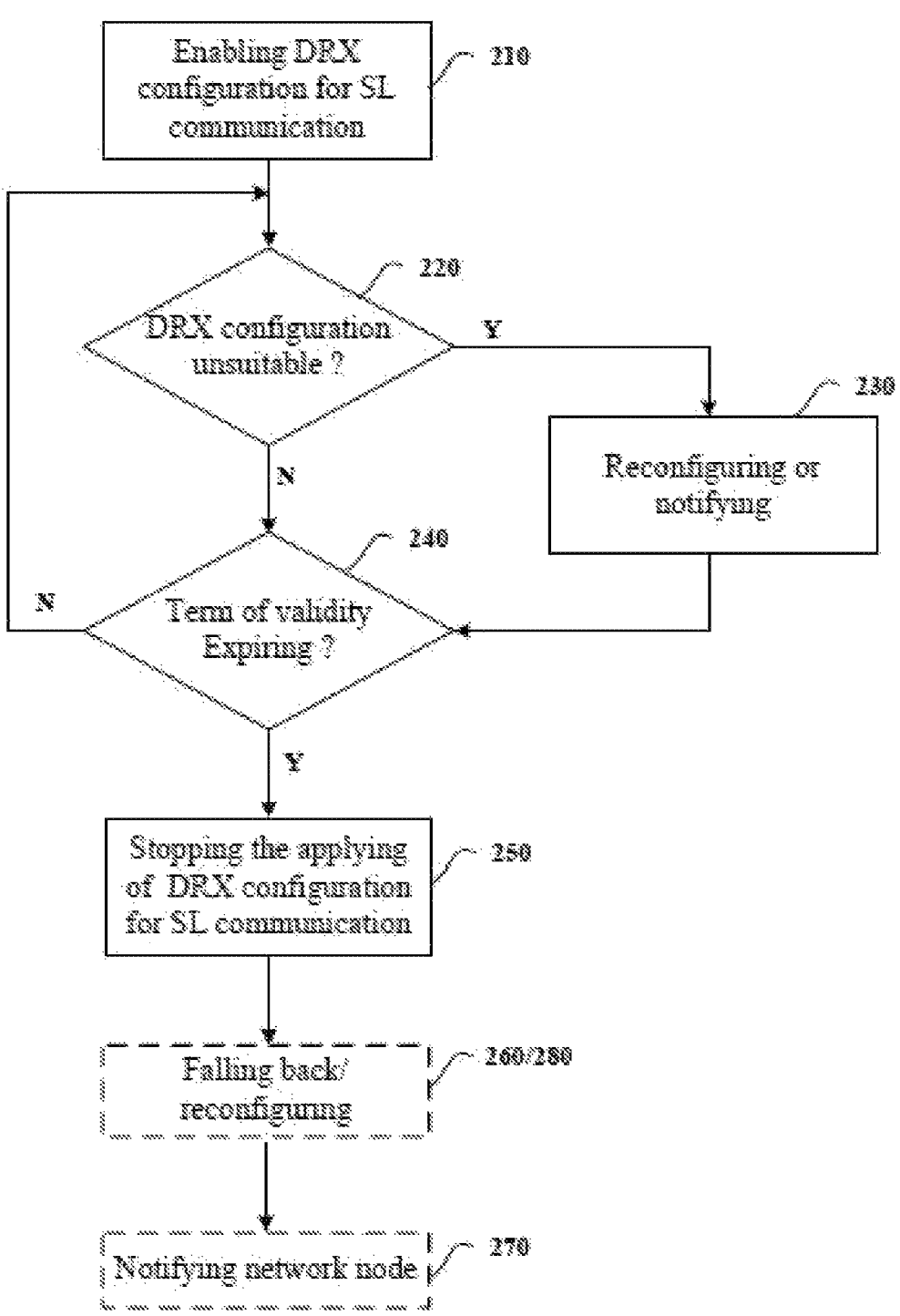
FIG. 2 illustrates is an example flowchart illustrating a method for controlling D2D communication implemented in a communication system, according to certain embodiments.

FIG. 2 is an example flowchart illustrating a method for controlling D2D communication implemented in a communication system, according to certain embodiments. The communication system includes a network node and two or more wireless communication devices and may be one described with reference to FIG. 1. For simplicity of the present disclosure, only drawing references to FIG. 1 will be included in this section.

At step 210, it enables DRX configuration for SL communication between the TX UE 101 and the RX UE 103. In other words, both the TX UE 101 and the RX UE 103 apply the DRX configuration or it makes the DRX configuration in effect.

In a particular embodiment, a DRX validity timer is introduced to indicate validity time of the DRX configuration. Thus, from the DRX validity timer, the TX UE 101 and/or the RX UE 103 can determine whether the validity time expires. The DRX validity timer can be arranged only at the TX UE 101 side, or at both the TX UE 101 and the RX UE 103.

To enable the DRX configuration for SL communication, certain embodiments described herein relate to a TX UE centric option. Other embodiments relate to a RX UE centric option.

TX UE Centric Option

In a particular embodiment, the TX UE 101 (or its serving gNB 105 in case the TX UE is in coverage) sends a desired SL DRX configuration to the RX UE 103. As a response, the RX UE 103 follows or applies the received SL DRX configuration if agreeing.

Thus, the TX UE 101 transmits data to the RX UE 103 only when the RX UE is in active. Furthermore, the TX UE 101 may start the DRX validity timer locally when or after sending the DRX configuration. Additionally, the RX UE 103 may start the DRX validity timer locally when or after receiving the DRX configuration.

RX UE Centric Option

In a particular embodiment, the RX UE 103 informs a TX UE of its DRX configuration. As a response, the TX UE 101 follows or applies the received DRX configuration from the RX UE if agreeing. Thus, the TX UE 101 transmits data to the RX UE 103 only when the RX UE 103 is in active. Furthermore, the TX UE 101 may start the DRX validity timer locally when or after receiving the DRX configuration. Additionally, the RX UE 103 may start the DRX validity timer locally when or after sending the DRX configuration.

According to various embodiments, the DRX validity timer may start, at step 210, in response to one of the following events: (1) the DRX configuration is transmitted at the TX UE 101; (2) the DRX configuration is received at the RX UE103; (3) an acknowledgment message from the RX UE 103 is received at the TX UE101; and (4) a pre-determined time period lapses after the DRX configuration is transmitted at the TX UE 101.

Optionally, in a particular embodiment, a starting time of the DRX validity timer can be represented as a relative time with respect to a reference time such as, for example, GNSS time.

At step 220, the TX UE 101 decides whether the DRX configuration is or will be unsuitable. If it is the case, the method proceeds with step 230, otherwise, it proceeds with step 240.

At this step, the decision is performed on the basis of judgment on suitability made at the TX UE or judgement on suitability made at the RX UE 103.

For illustrative purpose, one or more of the following criteria are available for judging whether the DRX configuration is unsuitable:

Criteria A: if an experienced SL communication time significantly deviates from an expected SL communication time during an observation window, the DRX configuration is considered as being unsuitable. For example, if a ratio of the experienced SL communication time to the expected SL communication time is larger than M where M>1, or smaller than N where N<1, it judges that the experienced SL communication time significantly deviates from the expected SL communication time.

Criteria B: if the experienced SL communication time well matches the expected SL communication time during the observation window, the DRX configuration is considered as being unsuitable. For example, if a ratio of the experienced SL communication time to the expected SL communication time is within [J, K], where N<J<1 and M>K>1, it judges that the experienced SL communication time well matches the expected SL communication time.

Criteria C: if a difference Td between the current time and the time when the DRX validity timer is expected to expire is larger than a threshold Th1, it judges that the experienced SL communication time significantly deviates from the expected SL communication time.

Criteria D: if one or more parameters indicate quality of the SL communication measured at the TX UE or the RX UE is below a threshold, the DRX configuration is unsuitable.

Criteria E: if one or more parameters indicate quality of the SL communication measured at the TX UE or the RX UE is above a threshold, the DRX configuration is unsuitable.

In the above criteria, the experienced SL communication time may be an overall time wherein SL transmission actually occurs during the observation window, and the expected SL DRX communication time may be an overall time wherein drx-onDurationTimer is running during the observation window.

In the above criteria, the parameters are selected from a group consisting of Reference Signal Received Power (RSRP), path loss, Signal to Noise Ratio (SNR), Signal Interference to Noise Ratio (SINR), Block Error Rate (BLER), number of acknowledgements (ACK)/non-acknowledgements (NACK), and Radio Link Control (RLC) retransmissions.

In certain embodiments, the RX UE 103 may judge the DRX configuration is unsuitable. In this scenario, the RX UE 103 may transmit, to the TX UE 101, a report on the judgement. Optionally, in various particular embodiments, the report may include recommended DRX configuration or associated parameters for DRX or range of suitable DRX cycles for reconfiguring the DRX configuration at the TX UE.

At step 230, the TX UE 101 reconfigures the DRX configuration or notifies a network node that the applied DRX configuration is or will be unsuitable.

At this step, the TX UE 101 may select a proper operation based on any of the criteria described above. For example, if Criteria A is met, the TX UE 101 may change the validity time by resetting the DRX validity timer or shortening the validity time by a certain margin H1. Meanwhile, since Criteria A is applicable to both the TE UE 101 and the RX UE 103, the RX UE 103 will follow the change of the validity time.

As another example, if Criteria B is met, the TX UE 101 may extend the validity time by a certain margin H2. Meanwhile, since Criteria B is applicable to both the TE UE 101 and the RX UE 103, the RX UE 103 will follow the change of the validity time.

As still another example, if Criteria C is met, the TX UE 101 may change the validity time by resetting the DRX validity timer or shortening the validity time by a certain margin H1. Meanwhile, since Criteria C is applicable to both the TE UE 101 and the RX UE 103, the RX UE 103 will follow the change of the validity time.

In the above criteria, H1, H2, J, K, M, N, Th1 and a length of the observation window can be configured by a network node 105, using common or dedicated control signaling or are preconfigured at the TX UE and/or RX UE.

As described above, when the RX UE 103 judges the DRX configuration is unsuitable, it may transmit to the TX UE 101 a report including recommended DRX configuration or associated parameters for DRX or range of suitable DRX cycles. Thus, at step 230, the TX UE may reconfigure the DRX configuration on the basis of recommended DRX configuration or associated parameters for DRX or range of suitable DRX cycles. Optionally, upon receiving from the RX UE 103 the report merely indicating the current DRX configuration is unsuitable, the TX UE 101 may fall back to a default DRX configuration or reconfigure the DRX configuration.

After step 230, the method proceeds to step 240 where the TX UE 101 determines whether the validity time expires. If it is the case that the validity timer has expired, the method proceeds with step 250; otherwise, the method proceeds to step 220.

At step 250, the current DRX configuration is disabled by the TX UE 101 and the RX UE 103. That is, the TX UE 101 and the RX UE 103 stop applying the current DRX configuration. For example, in the case of starting the DRX validity timer only at the TX UE, the disabling may include the TX UE stopping any applying of the DRX configuration. The TX UE may then notify the RX UE that the DRX configuration is inapplicable or the DRX validity timer expires.

On the other hand, in the case of starting the DRX validity timer at both the TX UE and the RX UE, the disabling of the DRX configuration may include the TX UE stopping any applying of the DRX configuration. However, the RX UE may stop applying the DRX configuration on the basis of local judgement made by the RX UE as to whether the DRX validity timer expires.

Optionally, in a particular embodiment, after step 250, the method may proceed with step 260 where either or both of TX UE 101 and RX UE 103 fall back to a default DRX configuration. At an optional step 270, the TX UE 101 may notify a network node 105 of the falling back to the default DRX configuration.

As an example, in a particular embodiment, the step of falling back to the default DRX configuration may be include the TX UE 101 falling back to (i.e., using) the default DRX configuration and then instructing the RX UE 103 to also use the default DRX configuration.

In a particular embodiment, the step of falling back to the default DRX configuration at step 260 is performed on if Criteria D is met. Thus, in a particular embodiment, the TX UE 101 and/or RX UE 103 may fall back to the default DRX configuration if the quality of the SL communication measured at the TX UE or the RX UE is below a threshold.

Optionally, in a particular embodiment, the default DRX configuration may be preconfigured and applicable to a group of UEs or a group of applications/services over SL.

Optionally, after step 250, the method may proceed with step 280 instead of step 260. At step 280, the TX UE 101 reconfigures the DRX configuration such as, for example, based on the one or more criteria as described above, and then transmits the reconfigured DRX configuration to the RX UE 103. The method then proceeds with step 270 where the TX UE 101 notifies a network node 105 of the expiration of the DRX configuration and/or the reconfigured DRX configuration.

Alternatively, in a particular embodiment, at step 280, the TX UE 101 may request the RX UE 103 to reconfigure the DRX configuration and then receive the reconfigured DRX configuration from the RX UE 103.

Figure 3:
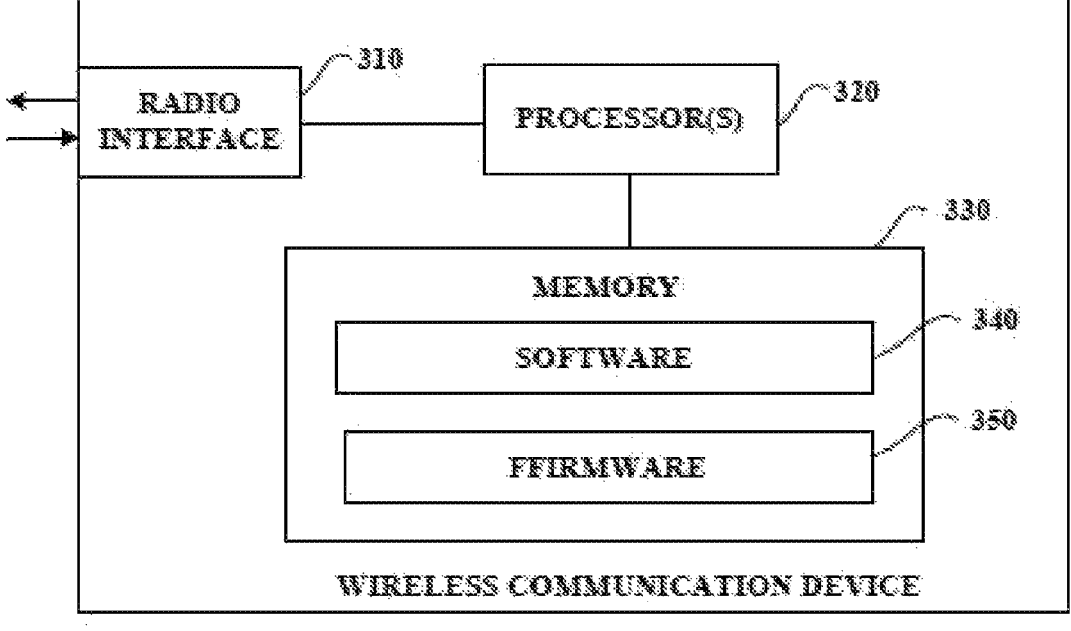
FIG. 3 illustrates an example processor-based implementation of a wireless communication device, according to certain embodiments.

FIG. 3 illustrates an example processor-based implementation of a wireless communication device, according to embodiments. As illustrated, the wireless communication device 300 includes one or more radio interfaces 310. The radio interface(s) 310 may for example be based on the NR technology or the LTE technology. The radio interface(s) 310 may support D2D communication, e.g., using SL communication as specified for the NR technology or the LTE technology.

Further, the wireless communication device 300 may include one or more processors 320 coupled to the radio interface(s) 310 and a memory 330 coupled to the processor(s) 320.

By way of example, the radio interface(s) 310, the processor(s) 320, and the memory 330 could be coupled by one or more internal bus systems of the wireless communication device 300. The memory 330 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 330 may include software 340 and/or firmware 350. The memory 330 may include suitably configured program code to be executed by the processor(s) 320 so as to implement the above-described functionalities for controlling D2D communication, such as explained in connection with FIGS. 1 and 2.

It is to be understood that the structure as illustrated in FIG. 3 is merely schematic and that the wireless communication device 300 may actually include further components which, for the sake of clarity, have not been illustrated, e.g., further interfaces, such as a dedicated management interface, or further processors. Also, it is to be understood that the memory 330 may include further program code for implementing known functionalities of a UE.

According to some embodiments, also a computer program may be provided for implementing functionalities of the wireless communication device 300, e.g., in the form of a physical medium storing the program code and/or other data to be stored in the memory 3300 or by making the program code available for download or by streaming.

FIG. 4 illustrates an example method 400 by a first wireless communication device for controlling Device-to-Device, D2D communication between a first wireless communication device and a second wireless communication device, according to certain embodiments. At step 402, the first wireless communication device transmits, to the second wireless communication device, a DRX configuration for the D2D communication with the second wireless communication device. At step 404, the first wireless communication device applies the DRX configuration for the D2D communication with the second wireless communication device. At step 406, the first wireless communication device receives, from the second wireless communication device, a notification indicating that the DRX configuration is unsuitable. Based on the notification, the first wireless communication device reconfigures the DRX configuration and/or notifying a network node that the applied DRX configuration is unsuitable, at step 408.

In a particular embodiment, based on the notification that the DRX configuration is unsuitable, the first wireless communication device stops the applying of the DRX configuration.

In a particular embodiment, the first wireless communication device performs at least one of: notifying the second wireless communication device that the first wireless communication device has stopped applying the DRX configuration; and notifying the network node that the first wireless communication device has stopped applying the DRX configuration.

In a particular embodiment, the first wireless communication device starts a DRX validity timer at the first wireless communication device and determines that a validity time associated with the DRX validity timer has expired. The DRX validity timer is started in response to at least one of: transmitting the DRX configuration to the second wireless communication device; receiving an acknowledgment message from the second wireless communication device; and determining that a pre-determined time period has lapsed after the DRX configuration is transmitted to the second wireless communication device.

In a particular embodiment, when an experienced D2D communication time deviates from an expected D2D communication time by more than a threshold amount during an observation window, the first wireless communication device resets the DRX validity timer or shortening the validity time by a certain margin.

In a particular embodiment, when an experienced D2D communication time does not deviate from an expected D2D communication time by more than a threshold amount during an observation window, the first wireless communication device extends a validity time by a certain margin.

In a particular embodiment, the first wireless communication device reconfigures the DRX configuration comprises falling back to a default DRX configuration at the first wireless communication device and notifies the network node of the falling back to the default DRX configuration.

In a particular embodiment, falling back to the default DRX configuration comprises: using the default DRX configuration; and instructing the second wireless communication device to use the default DRX configuration.

In a particular embodiment, the first wireless communication device transmits the reconfigured DRX configuration to the second wireless communication device.

In a particular embodiment, the first wireless communication device receives, from the network node, the reconfigured DRX configuration to the network node.

In a particular embodiment, the notification from the second wireless communication device comprises at least one of: a recommended DRX configuration; at least one parameter for DRX; and a range of suitable DRX cycles for reconfiguring the DRX configuration at the first wireless communication device; and the DRX configuration is reconfigured based on at least one of the recommended DRX configuration, the at least one parameter for DRX, and the range of suitable DRX cycles.

In a particular embodiment, the first wireless communication device transmits, to the network node, at least one of: the recommended DRX configuration, the at least one parameter for DRX, the range of suitable DRX cycles, and the reconfigured DRX configuration.

In a particular embodiment, the first wireless communication device is receiving the D2D communication from the second wireless device and the second wireless communication device is transmitting the D2D communication to the first wireless device.

FIG. 5 illustrates an example method 500 performed by the second wireless communication device, according to certain embodiments. At step 502, the second wireless communication device receives, from a first wireless communication device, a DRX configuration for the D2D communication with the first wireless communication device. At step 504, the second wireless communication device applies the DRX configuration for the D2D communication with the first wireless communication device.

At step 506, the second wireless communication device determines that the DRX configuration is unsuitable. In response to determining that the DRX configuration is or will be unsuitable, the second wireless communication device transmits, to the first wireless communication device, a notification indicating that the DRX configuration is unsuitable.

In a particular embodiment, in response to determining that the DRX configuration is unsuitable, the second wireless communication device stops the applying of the DRX configuration.

In a particular embodiment, determining that the DRX configuration is unsuitable comprises: starting a DRX validity timer at the second wireless communication device, and determining that a validity time associated with the DRX validity timer has expired. The DRX validity timer is started in response to at least one of: receiving the DRX configuration from the first wireless communication device; transmitting an acknowledgement message to the first wireless communication device after receiving the DRX configuration.

In a particular embodiment, when an experienced D2D communication time deviates from an expected D2D communication time by more than a threshold amount during an observation window, the second wireless communication device changes the validity time by resetting the DRX validity timer or shortening the validity time by a certain margin.

In a particular embodiment, when an experienced D2D communication time does not deviate from an expected D2D communication time by more than a threshold amount during an observation window, the second wireless communication device changes the validity time by extending the validity time by a certain margin.

In a particular embodiment, determining that the DRX configuration is unsuitable comprises receiving, from the first wireless communication device, a notification indicating that a validity time of the DRX configuration has expired.

In a particular embodiment, the second wireless communication device receives, from the first wireless communication device, a notification indicating to fall back to a default DRX configuration. Based on the notification from the first wireless communication device, the second wireless communication device applies the default DRX configuration.

In a particular embodiment, the second wireless communication device receives, from the first wireless communication device, a reconfigured DRX configuration and applies the reconfigured DRX configuration.

In a particular embodiment, the second wireless communication device transmits, to a network node, at least one of: a notification that the first wireless communication device and/or the second wireless communication device has fallen back to the default DRX configuration, or a notification that the first wireless communication device and/or the second wireless communication device is using the reconfigured DRX configuration, or a message that includes the reconfigured DRX configuration.

In a particular embodiment, the notification indicating that the DRX configuration is or will be unsuitable comprises at least one of: a recommended DRX configuration; at least one associated parameter for DRX; and a range of suitable DRX cycles for reconfiguring the DRX configuration at the first wireless communication device.

In a particular embodiment, determining that the DRX configuration is unsuitable comprises at least one of: determining that the second wireless communication device cannot support the DRX configuration due to mismatch between the DRX configuration and Wide Area Network, WAN, DRX or Uu DRX; determining that one or multiple new services or flows are being employed on the D2D communication between the first wireless communication device and second wireless communication device; and determining that a change of transmission power during one or more slots or during a time window is above a threshold amount.

In a particular embodiment, the first wireless communication device is receiving the D2D communication from the second wireless device, and the second wireless communication device is transmitting the D2D communication to the first wireless device.

Figure 6:
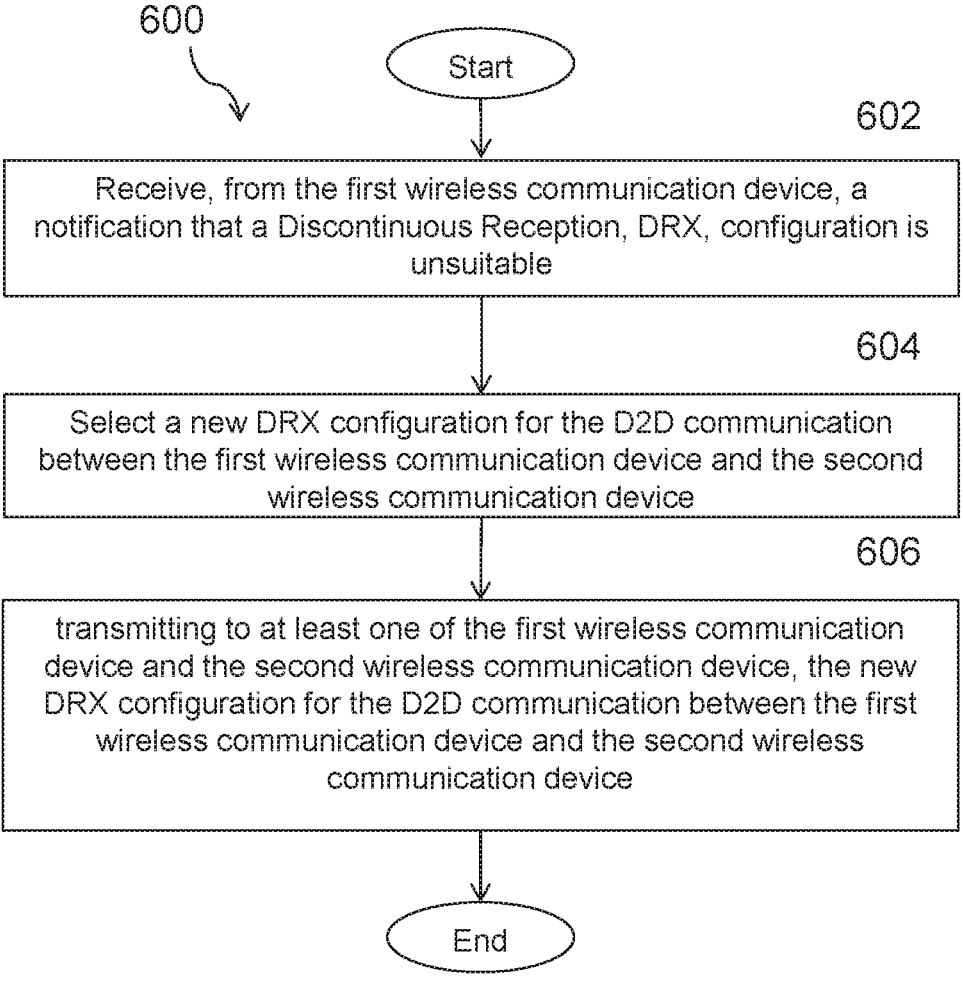
FIG. 6 illustrates an example method by a network node for assisting D2D communication between a first wireless communication device and a second wireless communication device, according to certain embodiments.

FIG. 6 illustrates an example method 600 by a network node for assisting D2D communication between a first wireless communication device and a second wireless communication device, according to certain embodiments. The method begins at step 602 when the network node receives, from the first wireless communication device, a notification that a Discontinuous Reception, DRX, configuration is unsuitable. At step 604, the network node selects a new DRX configuration for the D2D communication between the first wireless communication device and the second wireless communication device. At step 606, the network node transmits to at least one of the first wireless communication device and the second wireless communication device, the new DRX configuration for the D2D communication between the first wireless communication device and the second wireless communication device.

In a particular embodiment, the first wireless communication device is receiving the D2D communication from the second wireless device, and the second wireless communication device is transmitting the D2D communication to the first wireless device.

In a particular embodiment, the first wireless communication device is transmitting the D2D communication to the second wireless device, and the second wireless communication device is receiving the D2D communication from the first wireless device.

EXAMPLE EMBODIMENTS

Example Embodiment 1. A DRX validity Timer is introduced for SL DRX and is maintained at the TX UE or optionally also at the RX UE side. The timer is started or restarted when the associated DRX configuration takes effect. In one example, the timer starts when the DRX configuration is transmitted by the TX UE to the RX UE. In this case the timer starts in TX UE. In another example, the timer starts in TX UE when the DRX configuration is received by the RX UE from the TX UE. In another example, the timer may start in TX UE after receiving an acknowledgment message from the RX UE indicating that it has received the DRX configuration. In another example, the timer may start in TX UE after pre-determined time period lapses from transmitting the DRX configuration to the RX UE. In yet another example, the starting time of the timer is indicated by using a relative time with respect to a reference time, e.g. GNSS time. In another example, the RX UE may also start the DRX validity timer upon receiving the DRX configuration from the TX UE. Upon the expiration of the timer, anyone or more of the followings may be performed:

In case the timer is used in the TX UE, then the TX UE stops applying or using the SL DRX configuration when the DRX validity Timer expires. In case timer is used at both TX UE and RX UE, then both UEs stop applying the SL DRX configuration when the DRX validity Timer expires. In case the timer is used only in the TX UE, then the TX UE may further inform the RX UE that the current SL DRX configuration is unsuitable or not applicable. TX UE may also additionally or alternatively inform the RX UE that the validity timer for SL DRX has expired. The RX UE may also stop applying the SL DRX configuration as indicated or configured by the TX UE earlier. In one example, after the UEs stop applying the SL DRX configuration, the TX and RX UE may start operating in non-DRX. In another example, after stop applying the SL DRX configuration, the TX and RX UE may be refrained from performing SL operation with each other for a certain time period which may be preconfigured (e.g. on USIM card), pre-defined or configured by a node (e.g. another UE, base station etc.).

Fall back to use a default or common DRX configuration. For example, both TX and RX UE fall back a default, common or initial DRX configuration upon expiration of the timer. This DRX configuration is already configured or preconfigured and common to a group of UEs (e.g., the configuration is associated with a resource pool and/or by default could be applied to some or all kinds of applications/services over SL). In case the timer is used only at the TX UE, then the TX UE may inform the RX UE about the expiration of timer, enabling RX UE to also fall back to the default or common DRX configuration.

It may indicate the fall back and/or the timer expiration to the peer UE over PC5 using L1 signaling, PC5 MAC CE, PC5-RRC or control PDUs in a certain protocol layer such as adaptation layer.

The TX UE may trigger DRX reconfiguration procedure and/or request the RX UE to do so. The request triggers the RX UE to perform DRX reconfiguration and send the new DRX configuration to the TX UE.

TX UE and/or RX UE may inform the timer expiration and/or the reconfigured DRX configuration to the network node e.g. serving gNB. In another example, the TX UE and/or RX UE may further inform the network node of the event that the SL DRX configuration becomes invalid due to timer expiration. In another example, the TX UE and/or RX UE may further inform the network node that they are using a default or common DRX configuration.

In another example, the UEs may fall back to the default, initial or common DRX based on one or more parameters indicating that the quality of the SL communication becomes bad or below a threshold, wherein the quality may be measured by signal level of the radio link (e.g. RSRP, path loss), signal quality (e.g. SNR, SINR), signal error rate (e.g. BLER), number of ACK/NACK, RLC retransmissions etc.

Example Embodiment 2. The DRX validity Timer is made to expire earlier (e.g. reset or shorten by certain margin) when an experienced SL communication time deviates too much from an expected SL communication time during an observation window. The observation window is the time period over which the SL communication may take place between the TX and RX UE. In one example, the observation window can be of certain length which can be shorter than the time over which the sidelink communication may take place, and can be expressed in a number of DRX cycles. The DRX validity Timer is reset or re-initialized if the ratio of the experienced SL communication time to the expected SL communication time is larger than M (where M>1) or smaller than N (where N<1). In another example, the configured DRX validity duration value (T1) is reduced by certain margin (e.g. H1) if the ratio of the experienced SL communication time to the expected SL communication time is larger than M (where M>1) or smaller than N (where N<1), e.g. updated or reduced timer value (T1')=T1-H1. The parameters, H1, M, N and the observation window could be configured at network (NW) side by using common or dedicated control signaling or preconfigured at the UE. In yet another example, whether the DRX Validity Timer and/or duration is adapted (e.g. shorted or reset) depends on Td, where Td is the difference between the current time and the time when the timer is expected to expire. If Td>Th1, then UE may perform the adaptation of the DRX Validity Timer and/or duration as described above. Otherwise, the timer and/or the duration value is kept unchanged. The threshold Th1 can be preconfigured, predefined or configurable. In yet another example, the DRX validity Timer can be made to expire earlier based on one or more parameters indicating the quality of the SL communication. The said parameters comprise signal level of the radio link (e.g. RSRP, path loss), signal quality (e.g. SNR, SINR), signal error rate (e.g. BLER), number of ACK/NACK, RLC retransmissions etc. If one or more of these parameters indicate poor link or is going to be poor link, then the timer is made to expire earlier. In this way, the resources can be assigned explicitly or implicitly to other SL UEs which may need them.

Example Embodiment 3. The DRX validity Timer is made to expire later when the experienced SL communication time has a good match with the expected SL communication time during the observation window. In one example, the configured DRX validity duration value is extended if the ratio of the experienced SL communication time to the expected SL communication time is within [J, K], where N<J<1 and M>K>1. In one specific example, the configured DRX validity duration value (T2) is extended by certain margin (H2), e.g. the extended duration value (T2')=T2+H2. The parameters H2, J, K could also be configured at NW side by using common or dedicated control signaling or preconfigured at the UE. In yet another example, the DRX validity Timer can be made to expire later based on one or more parameters indicating the quality of the SL communication. The said parameters comprise signal level of the radio link (e.g. RSRP, path loss), signal quality (e.g. SNR, SINR), signal error rate (e.g. BLER), number of ACK/NACK, RLC retransmissions etc. If one or more of these parameters indicate good link quality, then the timer is made to expire later.

Example Embodiment 4. The DRX validity Timer is made to expire earlier/later via any one or more of the following ways:

Reduce/extend the DRX validity duration.

Adjust the DRX validity Timer to run faster/slower.

Example Embodiment 5. The experienced SL communication time could be the overall time wherein SL transmission actually occurs during the observation window. A UE may not transmit over SL even during DRX active period due to various different reasons, e.g. no data in TX buffer, Uu UL transmission takes precedence over SL transmission, etc. The expected SL DRX communication time could be the overall time wherein drx-onDurationTimer is running during the observation window.

Example Embodiment 6. Suppose UE1 and UE2 are communicating with each other over SL and it is UE1 that decides on the DRX configuration for communication with UE2 and sends the DRX configuration to UE2. In case UE2 determines or judges that the current DRX configuration is unsuitable or will soon become unsuitable, then UE2 informs UE1 that the current DRX configuration is unsuitable or will soon become unsuitable and therefore DRX reconfiguration is needed. In one example, UE2 may further provide recommended DRX configuration or associated parameters for DRX or range (e.g. range of suitable DRX cycles for UE2) which UE1 can consider when performing the DRX reconfiguration. When receiving such information, UE1 may trigger DRX reconfiguration procedure and/or (temporarily) fall back to use a default or common DRX configuration for communication with UE2. UE1 may also take into account the UE2's recommended DRX configuration or related parameters when performing DRX reconfiguration procedure. In one example, UE1 may use any of the UE2's recommended DRX cycle for the DRX reconfiguration procedure.

The DRX configuration may become unsuitable or invalid for UE2 for receiving signals from other UEs (e.g. UE1) when one or more of the following conditions are met (e.g. UE2 battery life is below threshold, UE2 memory or buffer size for sending data is above threshold, UE2 cannot process UE1 received signals etc.); otherwise the DRX configuration is considered as being suitable or valid for UE2.

Example Embodiment 7. UE2 determines that the current SL DRX configuration has become unsuitable (or invalid) or will soon become unsuitable (or invalid) when any one or more of the following conditions occur:

The UE2's experienced SL communication time for communication with UE1 deviates too much from the expected SL communication time with UE1 during an observation window. In one example, UE2 determines that the current SL DRX configuration is unsuitable if the ratio of the UE2's experienced SL communication time to the expected SL communication time is larger than M' (where M'>1) or smaller than N' (where N'<1).

The parameters M', N' and the observation window could be configured at NW side by using common or dedicated control signaling or preconfigured at the UE, and may be different from M. N and the observation window in Embodiment 2.

UE2 cannot or will not be able to support the SL DRX configuration due to e.g. the event that UE2 is or will be involved in other new SL transmission(s) and the overall energy consumption will become too high if continue to use the DRX configuration when communicating with UE1.

UE2 cannot or will not be able to support the SL DRX configuration due to e.g. the event that UE2 is or will be involved in WAN or cellular communication (e.g. Uu communication) with the network e.g. serving base station, and the current WAN DRX or Uu DRX is (to be) reconfigured or new WAN DRX or Uu DRX is (to be) configured. For instance, whether the SL DRX cycle configuration is suitable or not for UE2 depends on a relation between the SL DRX configuration and WAN or Uu DRX configuration. The relation can be pre-defined or configured by the network node.

In one example, if the SL DRX cycle and WAN or Uu DRX cycle are different, then UE2 considers the SL DRX configuration as being unsuitable; otherwise the SL DRX configuration is considered as being suitable by UE2. More specifically, if the SL DRX cycle and WAN or Uu DRX cycle differ by more than certain threshold, then the UE2 considers the SL DRX configuration as being unsuitable; otherwise the SL DRX configuration is considered as being suitable by UE2. In another example, if the SL DRX cycle is larger than the WAN or Uu DRX cycle by more than certain threshold, then the UE2 considers the SL DRX configuration as being unsuitable; otherwise the SL DRX configuration is considered as being suitable by UE2. In another example, if the SL DRX cycle is smaller than the WAN or Uu DRX cycle by more than certain threshold, then the UE2 considers the SL DRX configuration as being unsuitable; otherwise the SL DRX configuration is considered as being suitable by UE2.

In yet another example, if the SL DRX configuration and WAN or Uu DRX configuration are not (partial) aligned, then UE2 considers the SL DRX configuration as being unsuitable; otherwise the SL DRX configuration is considered as being suitable by UE2. A threshold Y % may be (pre)configured at or for the UE, and the two DRX configurations (i.e., the SL DRX configuration and the WAN or Uu DRX configuration) are determined as being (partial) aligned only when they give at least Y % overlapped active time among all active time according to the two DRX configurations. In this example, only slots while either drx-onDurationTimer or drx-Inactivity-Timer is running may be considered as active slots.

The QoS requirement on e.g. latency and/or date rate of one or multiple services on the SL cannot be met by UE2. For example for a service, if the latency of packet transmission (e.g. packet transmission delay) observed or determined by UE2 exceeds certain threshold, then UE2 may consider the current SL DRX configuration as being unsuitable or invalid; otherwise the SL DRX configuration is considered as being suitable or valid by UE2.

One or multiple new services or flows are being employed on the SL between UE1 and UE2. For example, UE1 starts to transmit data of one or multiple new services or flows to UE2, the new services or flows have different QoS requirements from the existing services on the SL.

The measured radio link quality by UE2 in terms of metrics (e.g., path loss or RSRP, RSRQ, RSSI, SINR, SIR or recent transmission power) has a change larger than a (pre)configured threshold.

The change of transmission power during recent slots or recent time window is above a (pre)configured threshold.

The change in energy situation of the UE, e.g. the remained available energy (e.g. battery power) of UE2 becomes smaller than a certain threshold, temperature at UE2 increases above certain threshold (e.g. due to overheating etc.), UE2 power or energy required to receive and process SL signals from other UEs (e.g. UE1) is above certain threshold etc.

UE2 may further inform UE1 the one or more conditions or criteria due to which or based on which UE2 has determined that the current SL DRX configuration has become unsuitable (or invalid) or is expected to unsuitable (or invalid).

Example Embodiment 8. A method for controlling D2D communication, comprises the steps performed by a first wireless communication device: a) applying (210) Discontinuous Reception (DRX) configuration for Sidelink (SL) communication with a second wireless communication device; b) if deciding (220) that the applied DRX configuration is or will be unsuitable, reconfiguring (230) the applied DRX configuration or notifying (230) a network node that the applied DRX configuration is or will be unsuitable, wherein the deciding is performed on the basis of judgment on suitability made at the first wireless communication device or judgement on suitability made at the second wireless communication device; and c) if validity time of the applied DRX configuration expires, deciding that the applied DRX configuration is unsuitable.

Example Embodiment 9. The method according to Example Embodiment 8 further includes a DRX validity timer being used for determining whether the validity time expires at the first wireless communication device or the second wireless communication device.

Example Embodiment 10. The method according to Example Embodiment 9, the step a) comprising: applying the DRX configuration at the first wireless communication device for communication with the second wireless communication device; notifying the second wireless communication that the DRX configuration is applicable; and starting the DRX validity timer at the first wireless communication device.

Example Embodiment 10. The method according to Example Embodiment 10, wherein the DRX validity timer starts in response to one of the following events: (1) the DRX configuration is transmitted at the first wireless communication device; (2) an acknowledgment message from the second wireless communication device is received at the first wireless communication device; and (3) a pre-determined time period lapses after the DRX configuration is transmitted at the first wireless communication device.

Example Embodiment 11. The method according to Example Embodiment 9, a starting time of the DRX validity timer is represented as a relative time with respect to a reference time.

Example Embodiment 12. The method according to Example Embodiment 10, wherein in the case of starting the DRX validity timer at the first wireless communication device, the step c) comprising: stopping the applying of the DRX configuration at the first wireless communication device when it determines at the first wireless communication device that the DRX validity timer expires; and notifying the second wireless communication device of the stopping of the applying or expiration of the DRX validity timer.

Example Embodiment 13. The method according to Example Embodiment 10, wherein in the case of starting the DRX validity timer at the first wireless communication device and the second wireless communication device, the step c) comprising: stopping the applying of the DRX configuration at the first wireless communication device when it determines at the first wireless communication device that the DRX validity timer expires.

Example Embodiment 14. The method according to Example Embodiment 9, further comprising: d) falling back (260) to a default DRX configuration at the first wireless communication device; and e) notifying (270) a network node of the falling back to the default DRX configuration.

Example Embodiment 15. The method according to Example Embodiment 14, wherein the default DRX configuration is preconfigured and applicable to a group of UEs or a group of applications/services over SL.

Example Embodiment 16. The method according to Example Embodiment 14, the falling back to the default DRX configuration comprising: using the default DRX configuration; and instructing the second wireless communication device to use the default DRX configuration.

Example Embodiment 17. The method according to Example Embodiment 9, further comprising: g) reconfiguring (280) the DRX configuration; and h) transmitting reconfigured DRX configuration to the second wireless communication device.

Example Embodiment 18. The method according to Example Embodiment 16 or 17, further comprising: notifying (270) a network node of the expiration of the DRX configuration and/or the reconfigured DRX configuration.

Example Embodiment 19. The method according to Example Embodiment 9, wherein the step b) comprising: if an experienced SL communication time significantly deviates from an expected SL communication time during an observation window, changing the validity time by resetting the DRX validity timer or shortening the validity time by a certain margin H1.

Example Embodiment 20. The method according to Example Embodiment 19, wherein if a ratio of the experienced SL communication time to the expected SL communication time is larger than M where M>1, or smaller than N where N<1, judging that the experienced SL communication time significantly deviates from the expected SL communication time.

Example Embodiment 21. The method according to Example Embodiment 19, wherein the step b) comprising: if a difference Td between the current time and the time when the DRX validity timer is expected to expire is larger than a threshold Th1, judging that the experienced SL communication time significantly deviates from the expected SL communication time; and changing the validity time by resetting the DRX validity timer or shortening the validity time by a certain margin H1.

Example Embodiment 22. The method according to anyone of Example Embodiments 19 to 21, wherein H1, M, N, Th1 and a length of the observation window are configured by a network node using common or dedicated control signaling or are preconfigured at the first wireless communication device.

Example Embodiment 23. The method according to Example Embodiment 9, wherein the step b) comprising: if an experienced SL communication time well matches an expected SL communication time during an observation window, changing the validity time by extending the validity time by a certain margin H2.

Example Embodiment 24. The method according to Example Embodiment 23, wherein if a ratio of the experienced SL communication time to the expected SL communication time is within [J, K], where N<J<1 and M>K>1, judging that the experienced SL communication time well matches the expected SL communication time.

Example Embodiment 25. The method according to Example Embodiment 23 or 24, wherein H2, J and K are configured by a network node using common or dedicated control signaling or are preconfigured at the first wireless communication device.

Example Embodiment 26. The method according to anyone of Example Embodiments 19 to 25, wherein the experienced SL communication time is an overall time wherein SL transmission actually occurs during the observation window, and the expected SL DRX communication time is an overall time wherein drx-onDuration Timer is running during the observation window.

Example Embodiment 27. The method according to Example Embodiment 9, wherein the step b) comprising: receiving a report from the second wireless communication device that the DRX configuration is or will be unsuitable at the second wireless communication device, wherein the report includes recommended DRX configuration or associated parameters for DRX or range of suitable DRX cycles for reconfiguring the DRX configuration at the first wireless communication device; and reconfiguring the DRX configuration based on the recommended DRX configuration or associated parameters for DRX or range of suitable DRX cycles.

Example Embodiment 28. The method according to Example Embodiment 9, wherein the step b) comprising: receiving a report from the second wireless communication device that the DRX configuration is or will be unsuitable at the second wireless communication device; and falling back to a default DRX configuration.

Example Embodiment 29. A method for controlling Device-to-Device (D2D) communication, comprising the steps performed by a second wireless communication device: a) from a first wireless communication device, receiving Discontinuous Reception (DRX) configuration for Sidelink (SL) communication with the first wireless communication device; b) applying the DRX configuration for SL communication with the first wireless communication device; and c) if deciding that the applied DRX configuration is or will be unsuitable, notifying the first wireless communication device that the applied DRX configuration is or will be unsuitable.

Example Embodiment 30. The method according to Example Embodiment 29, wherein a DRX validity timer is used for determining whether the validity time expires at the first wireless communication device or the second wireless communication device.

Example Embodiment 31. The method according to Example Embodiment 30, wherein the DRX validity timer is used at the second wireless communication device, and further comprising: d) if the validity time of the applied DRX configuration expires, stopping the applying of the applied DRX configuration.

Example Embodiment 32. The method according to Example Embodiment 30, wherein the DRX validity timer is used at the first wireless communication device, and further comprising: d) in response to a notification from the first wireless communication device that the validity time of the applied DRX configuration expires, stopping the applying of the applied DRX configuration.

Example Embodiment 33. The method according to Example Embodiment 30, wherein the step a) comprising: transmitting an acknowledgment message to the first wireless communication device that the DRX configuration is received.

Example Embodiment 34. The method according to Example Embodiment 30, wherein the DRX validity timer is used at the second wireless communication device, and the step-b) comprising: starting the DRX validity timer at the second wireless communication device in response to an event that the DRX configuration is received at the second wireless communication device.

Example Embodiment 35. The method according to Example Embodiment 30, a starting time of the DRX validity timer is represented as a relative time with respect to a reference time.

Example Embodiment 36. The method according to Example Embodiment 30 further comprising: e) receiving from the first wireless communication device a notification on the falling back to a default DRX configuration; and f) applying the default DRX configuration.

Example Embodiment 37. The method according to Example Embodiment 36, wherein the default DRX configuration is preconfigured and applicable to a group of UEs or a group of applications/services over SL.

Example Embodiment 38. The method according to Example Embodiment 30, further comprising: g) receiving reconfigured DRX configuration from the first wireless communication device; and h) applying the reconfigured DRX configuration.

Example Embodiment 39. The method according to Example Embodiment 38, further comprising: notifying a network node of the reconfigured DRX configuration.

Example Embodiment 40. The method according to Example Embodiment 30, wherein the DRX validity timer is used at the second wireless communication device, the step c) comprising: if an experienced SL communication time significantly deviates from an expected SL communication time during an observation window, changing the validity time by resetting the DRX validity timer or shortening the validity time by a certain margin H1.

Example Embodiment 41. The method according to Example Embodiment 40, wherein if a ratio of the experienced SL communication time to the expected SL communication time is larger than M where M>1, or smaller than N where N<1, judging that the experienced SL communication time significantly deviates from the expected SL communication time.

Example Embodiment 42. The method according to Example embodiment 40, wherein the DRX validity timer is used at the second wireless communication device, the step c) comprising: if a difference Td between the current time and the time when the DRX validity timer is expected to expire is larger than a threshold Th1, judging that the experienced SL communication time significantly deviates from the expected SL communication time; and changing the validity time by resetting the DRX validity timer or shortening the validity time by a certain margin H1.

Example Embodiment 43. The method according to Example Embodiments 41 to 42, wherein H1, M, N, Th1 and a length of the observation window are configured by a network node using common or dedicated control signaling or are preconfigured at the second wireless communication device.

Example Embodiment 44. The method according to Example Embodiment 30, wherein the DRX validity timer is used at the second wireless communication device, the step c) comprising: if an experienced SL communication time well matches an expected SL communication time during an observation window, changing the validity time by extending the validity time by a certain margin H2.

Example Embodiment 45. The method according to Example Embodiment 44, wherein if a ratio of the experienced SL communication time to the expected SL communication time is within [J, K], where N<J<1 and M>K>1, judging that the experienced SL communication time well matches the expected SL communication time.

Example Embodiment 46, the method according to Example Embodiments 43 to 44, wherein H2, J and K are configured by a network node using common or dedicated control signaling or are preconfigured at the second wireless communication device.

Example Embodiment 47. The method according to anyone of Example Embodiments 38 to 44, wherein the experienced SL communication time is an overall time wherein SL transmission actually occurs during the observation window, and the expected SL DRX communication time is an overall time wherein drx-onDuration Timer is running during the observation window.

Example Embodiment 48. The method according to Example Embodiment 30, wherein the step c) comprising: transmitting to the first wireless communication device a report that the DRX configuration is or will be unsuitable at the second wireless communication device, wherein the report includes recommended DRX configuration or associated parameters for DRX or range of suitable DRX cycles for reconfiguring the DRX configuration at the first wireless communication device; and receiving reconfigured DRX configuration from the first wireless communication device.

Example Embodiment 49. The method according to Example Embodiment 30, wherein the step c) comprising: transmitting to the first wireless communication device a report that the DRX configuration is or will be unsuitable at the second wireless communication device; and receiving from the first wireless communication device a notification on falling back to a default DRX configuration.

Example Embodiment 50. The method according to Example Embodiment 29, wherein at step c), if the second wireless communication device cannot support the DRX configuration due to mismatch between the DRX configuration and WAN DRX or Uu DRX to be configured, it judges that the DRX configuration is unsuitable.

Example Embodiment 51. The method according to Example Embodiment 29, wherein at step c), if one or multiple new services or flows are being employed on the SL between the first wireless communication device and second wireless communication device, it judges that the DRX configuration is unsuitable.

Example Embodiment 52. The method according to Example Embodiment 29, wherein at step c), if a change of transmission power during recent slots or recent time window is above a preconfigured threshold, it judges that the DRX configuration is unsuitable.

Example Embodiment 53. A wireless communication device (300), comprising: at least one processor (320); and a memory (330) containing program code executable by the at least one processor, whereby execution of the program code by the at least one processor causes the wireless communication device to perform a method according to anyone of Example Embodiments 1 to 52.

Example Embodiment 54. A computer program product being embodied in a computer readable storage medium and comprising program code to be executed by at least one processor of a wireless communication device, whereby execution of the program code causes the wireless communication device to perform a method according to anyone of Example Embodiments 1 to 52.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the scope of the disclosure as those skilled in the art readily understand. Such modifications and variations are considered to be within the scope of the disclosure and the appended claims. The protection scope of the disclosure is defined by the accompanying claims.

What is claimed is:

1. A method by a first wireless communication device for controlling Device-to-Device, D2D, communication between the first wireless communication device and a second wireless communication device, the method performed by the first wireless communication device and comprising:

transmitting, to the second wireless communication device, a Discontinuous Reception, DRX, configuration for the D2D communication with the second wireless communication device;

applying the DRX configuration for the D2D communication with the second wireless communication device;

starting a DRX validity timer at the first wireless communication device;

based on whether an experienced D2D communication time deviates or does not deviate from an expected D2D communication time by more than a threshold amount during an observation window, changing the DRX validity timer;

receiving, from the second wireless communication device, a notification indicating that the DRX configuration is unsuitable; and based on the notification, reconfiguring the DRX configuration and/or notifying a network node that the applied DRX configuration is unsuitable.

2. A first wireless communication device for controlling Device-to-Device, D2D, communication between the first wireless communication device and a second wireless communication device, the first wireless communication device comprising:

a memory storing instructions; and processing circuitry configured to execute the instructions to cause the first wireless communication device to:

transmit, to the second wireless communication device, a Discontinuous Reception, DRX, configuration for the D2D communication with the second wireless communication device;

apply the DRX configuration for the D2D communication with the second wireless communication device;

starting a DRX validity timer at the first wireless communication device;

based on whether an experienced D2D communication time deviates or does not deviate from an expected D2D communication time by more than a threshold amount during an observation window, changing the DRX validity timer;

receive, from the second wireless communication device, a notification indicating that the DRX configuration is unsuitable; and based on the notification, reconfigure the DRX configuration and/or notifying a network node that the applied DRX configuration is unsuitable.

3. The first wireless communication device according to claim 2, wherein the processing circuitry is configured to execute the instructions to cause the first wireless communication device to:

based on the notification that the DRX configuration is unsuitable, stop the applying of the DRX configuration.

4. The first wireless communication device according to claim 3, wherein the processing circuitry is configured to execute the instructions to cause the first wireless communication device to perform at least one of:

notify the second wireless communication device that the first wireless communication device has stopped applying the DRX configuration; and notify the network node that the first wireless communication device has stopped applying the DRX configuration.

5. The first wireless communication device according to claim 2, wherein the processing circuitry is configured to execute the instructions to cause the first wireless communication device to:

determine that a validity time associated with the DRX validity timer has expired; and wherein the DRX validity timer is started in response to at least one of:

transmitting the DRX configuration to the second wireless communication device;

receiving an acknowledgment message from the second wireless communication device; and determining that a pre-determined time period has lapsed after the DRX configuration is transmitted to the second wireless communication device.

6. The first wireless communication device according to claim 5, wherein:

when the experienced D2D communication time deviates from the expected D2D communication time by more than the threshold amount during the observation window, the processing circuitry is configured to execute the instructions to cause the first wireless communication device to change the DRX validity time by resetting the DRX validity timer or shortening the validity time by a certain margin.

7. The first wireless communication device according to claim 5, wherein:

when the experienced D2D communication time does not deviate from the expected D2D communication time by more than the threshold amount during the observation window, the processing circuitry is configured to execute the instructions to cause the first wireless communication device to change the DRX validity time by extending a validity time by a certain margin.

8. The first wireless communication device according to claim 2, wherein:

reconfiguring the DRX configuration comprises falling back to a default DRX configuration at the first wireless communication device; and notifying the network node of the falling back to the default DRX configuration.

9. The first wireless communication device according to claim 8, wherein falling back to the default DRX configuration comprises:

using the default DRX configuration; and instructing the second wireless communication device to use the default DRX configuration.

10. The first wireless communication device according to claim 2, wherein the processing circuitry is configured to execute the instructions to cause the first wireless communication device to:

transmit the reconfigured DRX configuration to the second wireless communication device.

11. The first wireless communication device according to claim 2, wherein the processing circuitry is configured to execute the instructions to cause the first wireless communication device to:

receive, from the network node, the reconfigured DRX configuration to the network node.

12. The first wireless communication device according to claim 2, wherein:

the notification from the second wireless communication device comprises at least one of:

a recommended DRX configuration;

at least one parameter for DRX; and a range of suitable DRX cycles for reconfiguring the DRX configuration at the first wireless communication device; and the DRX configuration is reconfigured based on at least one of the recommended DRX configuration, the at least one parameter for DRX, and the range of suitable DRX cycles.

13. The first wireless communication device according to claim 2, wherein the processing circuitry is configured to execute the instructions to cause the first wireless communication device to transmit, to the network node, at least one of:

the recommended DRX configuration, the at least one parameter for DRX, the range of suitable DRX cycles, and the reconfigured DRX configuration.

14. The first wireless communication device according to claim 2, wherein:

the first wireless communication device is receiving the D2D communication from the second wireless device, and the second wireless communication device is transmitting the D2D communication to the first wireless device.

15. A second wireless communication device for controlling Device-to-Device, D2D, communication between a first wireless communication device and the second wireless communication device, the second wireless communication device comprising:

a memory storing instructions; and processing circuitry configured to execute the instructions to cause the first wireless communication device to:

receive, from a first wireless communication device, a Discontinuous Reception, DRX, configuration for the D2D communication with the first wireless communication device;

apply the DRX configuration for the D2D communication with the first wireless communication device;

start a DRX validity timer at the second wireless communication device;

determine that the DRX configuration is unsuitable; based on whether an experienced D2D communication time deviates or does not deviate from an expected D2D communication time by more than a threshold amount during an observation window, changing the DRX validity timer; and in response to determining that the DRX configuration is unsuitable, transmit, to the first wireless communication device, a notification indicating that the DRX configuration is unsuitable.

16. The second wireless communication device according to claim 15, wherein the processing circuitry is configured to execute the instructions to cause the second wireless communication device to:

in response to determining that the DRX configuration is unsuitable, stop the applying of the DRX configuration.

17. The second wireless communication device of claim 15, wherein determining that the DRX configuration is unsuitable comprises:

determining that a validity time associated with the DRX validity timer has expired, and wherein the DRX validity timer is started in response to at least one of:

receiving the DRX configuration from the first wireless communication device;

transmitting an acknowledgement message to the first wireless communication device after receiving the DRX configuration.

18. The second wireless communication device according to claim 17, wherein:

when the experienced D2D communication time deviates from the expected D2D communication time by more than the threshold amount during the observation window, the processing circuitry is configured to execute the instructions to cause the second wireless communication device to change the validity time by resetting the DRX validity timer or shortening the validity time by a certain margin.

19. The second wireless communication device according to claim 17, wherein:

when the experienced D2D communication time does not deviate from the expected D2D communication time by more than the threshold amount during the observation window, the processing circuitry is configured to execute the instructions to cause the second wireless communication device change the validity time by extending the validity time by a certain margin.

20. The second wireless communication device according claim 15, wherein determining that the DRX configuration is unsuitable comprises:

receiving, from the first wireless communication device, a notification indicating that a validity time of the DRX configuration has expired.

21. The second wireless communication device according to claim 15, wherein the processing circuitry is configured to execute the instructions to cause the second wireless communication device to:

receive, from the first wireless communication device, a notification indicating to fall back to a default DRX configuration; and based on the notification from the first wireless communication device, apply the default DRX configuration.

22. The second wireless communication device according to claim 21, wherein the processing circuitry is configured to execute the instructions to cause the second wireless communication device to:

receive, from the first wireless communication device, a reconfigured DRX configuration; and apply the reconfigured DRX configuration.

23. The second wireless communication device according to claim 21, wherein the processing circuitry is configured to execute the instructions to cause the second wireless communication device to transmit, to a network node, at least one of:

a notification that the first wireless communication device and/or the second wireless communication device has fallen back to the default DRX configuration, or a notification that the first wireless communication device and/or the second wireless communication device is using the reconfigured DRX configuration, or a message that includes the reconfigured DRX configuration.

24. The second wireless communication device according to claim 15, wherein the notification indicating that the DRX configuration is or will be unsuitable comprises at least one of:

a recommended DRX configuration;

at least one associated parameter for DRX; and a range of suitable DRX cycles for reconfiguring the DRX configuration at the first wireless communication device.

25. The second wireless communication device according to claim 15, wherein determining that the DRX configuration is unsuitable comprises at least one of:

determining that the second wireless communication device cannot support the DRX configuration due to mismatch between the DRX configuration and Wide Area Network, WAN, DRX or Uu DRX;

determining that one or multiple new services or flows are being employed on the D2D communication between the first wireless communication device and second wireless communication device; and determining that a change of transmission power during one or more slots or during a time window is above a threshold amount.

26. The second wireless communication device according to claim 15, wherein:

the first wireless communication device is receiving the D2D communication from the second wireless device, and the second wireless communication device is transmitting the D2D communication to the first wireless device.

* * * * *